US008181049B2

(12) United States Patent
Rozen et al.

(10) Patent No.: US 8,181,049 B2
(45) Date of Patent: May 15, 2012

(54) METHOD FOR CONTROLLING A FREQUENCY OF A CLOCK SIGNAL TO CONTROL POWER CONSUMPTION AND A DEVICE HAVING POWER CONSUMPTION CAPABILITIES

(75) Inventors: Anton Rozen, Gedera (IL); Roman Mostinski, Jerusalem (IL); Michael Priel, Hertzelia (IL)

(73) Assignee: Freescale Semiconductor, Inc., Austin, TX (US)

( * ) Notice: Subject to any disclaimer, the term of this patent is extended or adjusted under 35 U.S.C. 154(b) by 567 days.

(21) Appl. No.: 12/355,218

(22) Filed: Jan. 16, 2009

(65) Prior Publication Data
US 2010/0185878 A1 Jul. 22, 2010

(51) Int. Cl.
*G06F 1/32* (2006.01)
(52) U.S. Cl. ....................................................... 713/322
(58) Field of Classification Search .................. 713/322
See application file for complete search history.

(56) References Cited

U.S. PATENT DOCUMENTS

| | | |
|---|---|---|
| 5,696,491 A | 12/1997 | White et al. |
| 5,963,023 A | 10/1999 | Herrell et al. |
| 6,173,409 B1 * | 1/2001 | Watts et al. ................... 713/322 |
| 6,574,739 B1 * | 6/2003 | Kung et al. ................... 713/322 |
| 6,636,976 B1 * | 10/2003 | Grochowski et al. ......... 713/320 |
| 7,043,649 B2 * | 5/2006 | Terrell, II ...................... 713/322 |
| 7,058,824 B2 * | 6/2006 | Plante et al. .................. 713/300 |
| 7,155,617 B2 * | 12/2006 | Gary et al. .................... 713/300 |
| 7,180,380 B2 | 2/2007 | Bienek et al. |
| 7,360,100 B2 * | 4/2008 | Allred et al. .................. 713/300 |
| 7,441,137 B1 * | 10/2008 | Mimberg ...................... 713/340 |
| 7,552,353 B2 * | 6/2009 | Ho et al. ....................... 713/600 |
| 7,752,479 B2 * | 7/2010 | Liang et al. ................... 713/500 |
| 2002/0133729 A1 * | 9/2002 | Therien et al. ................ 713/330 |
| 2005/0269093 A1 | 12/2005 | Sandberg et al. |
| 2007/0198872 A1 * | 8/2007 | Bailey et al. .................. 713/601 |
| 2007/0257713 A1 | 11/2007 | Korbinian et al. |
| 2009/0013201 A1 * | 1/2009 | He et al. ....................... 713/322 |

* cited by examiner

*Primary Examiner* — Chun Cao

(57) ABSTRACT

A method for controlling power consumption of a processor, the method includes: receiving an indicator that indicates that the processor is expected to change its activity; determining, in response to the indicator and to a current power consumption of the processor, whether to change a frequency of a clock signal that is provided to the processor; and changing, if determining to change the frequency of the clock signal, the frequency of the clock signal by a reduction of the frequency of the clock signal that is followed by an increment of the frequency of the clock signal; wherein the changing of the frequency of the clock signal is responsive to an expected change of a supply voltage that is supplied to the processor as a result of a possible change in a power consumption of the processor due to an expected change of activity of the processor.

18 Claims, 6 Drawing Sheets

METHOD FOR CONTROLLING A FREQUENCY OF A CLOCK SIGNAL TO CONTROL POWER CONSUMPTION AND A DEVICE HAVING POWER CONSUMPTION CAPABILITIES

FIELD OF THE INVENTION

This disclosure relates generally to a power consumption method and device for controlling power consumption and especially to a device and a method for preventing voltage supply drops that can render a processor inoperative.

BACKGROUND OF THE INVENTION

Processors are circuits that can process tasks, code, middleware, and the like and are characterized by power consumption changes. Non-limiting examples of processors include general purpose processors, digital signal processors, controllers, direct memory access controllers and the like.

Processors can be characterized by fast power consumption changes. The power consumption changes can result from turning on the processor or some of the circuits of the processor, as well as changes in the computational loads of the processor.

The processor and more exactly the integrated circuit that includes the processor receive a supply voltage from a voltage source. The supply voltage is provided via a supply network that may include capacitors. Fast changes in the power consumption of the processor can result in a voltage drop—a reduction of the supply voltage provided to the processor. This reduction can result in a provision of a supply voltage that is lower than a level required for the operation of the processor. The voltage drop can occur due to the relatively slow response of the voltage source and, additionally or alternatively from the supply network and especially the bypass capacitors (C), inductive (L) and resistance (R) elements for supply path on the board, as well as parasitic RLC elements.

FIG. 1 schematically illustrates multiple signals.

Curve 1 illustrates the performance (in Million Instructions Per Second—MIPS) of a processor. During a first period (before T1 8) processor operates a low performance mode and its performance is low (P1 2), during a second period (between T1 8 and T2 9) the performance is high (P2 3) and during a third period (after T2 9) the performance is low again (P1 2).

Curve 6 illustrates the current consumption of a processor. The current consumption is correlated with the performance. During the first period (before T1 8) the processor operates in the low performance mode and consumes a low amount of current (I1 4), during the second period (between T1 8 and T2 9) the current consumption is high (I2 5) and during a third period (after T2 9) the current is low again (I1 4).

Curve 7 illustrates the supply voltage that is supplied by a voltage source to a device that includes the processor. Threshold 10 is a minimal value of the supply voltage that should be supplied to the processor in order to allow functional operation. A first event that changes the power consumption of the processor occurs at T1 8 and is followed by a fast increment of the power consumption of the processor and the voltage source recovers from this fast increment only after a regulation period 11 ends. During this regulation period the supply voltage drops (by voltage drop 13) below threshold 10 and causes the processor to malfunction. A second event that changes the power consumption of the processor occurs at T2 9 and is followed by a regulation period 9' during which the supply voltage is slightly incremented.

Dynamic voltage and frequency scaling (DVFS) technique reduces power consumption of an integrated circuit by increasing the supply voltage level and frequency of a clock signal provided to a processor when the computational load of the computer increases. The reaction time and working time window of this technique is much slower (hundreds and thousands of the clock cycles) and can not be implemented for voltage regulation with resolution of discussed issue.

SUMMARY OF THE PRESENT INVENTION

The present invention provides a method and a device as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

Further details, aspects, and embodiments of the invention will be described, by way of example only, with reference to the drawings.

DETAILED DESCRIPTION OF THE DRAWINGS

Figure 1:
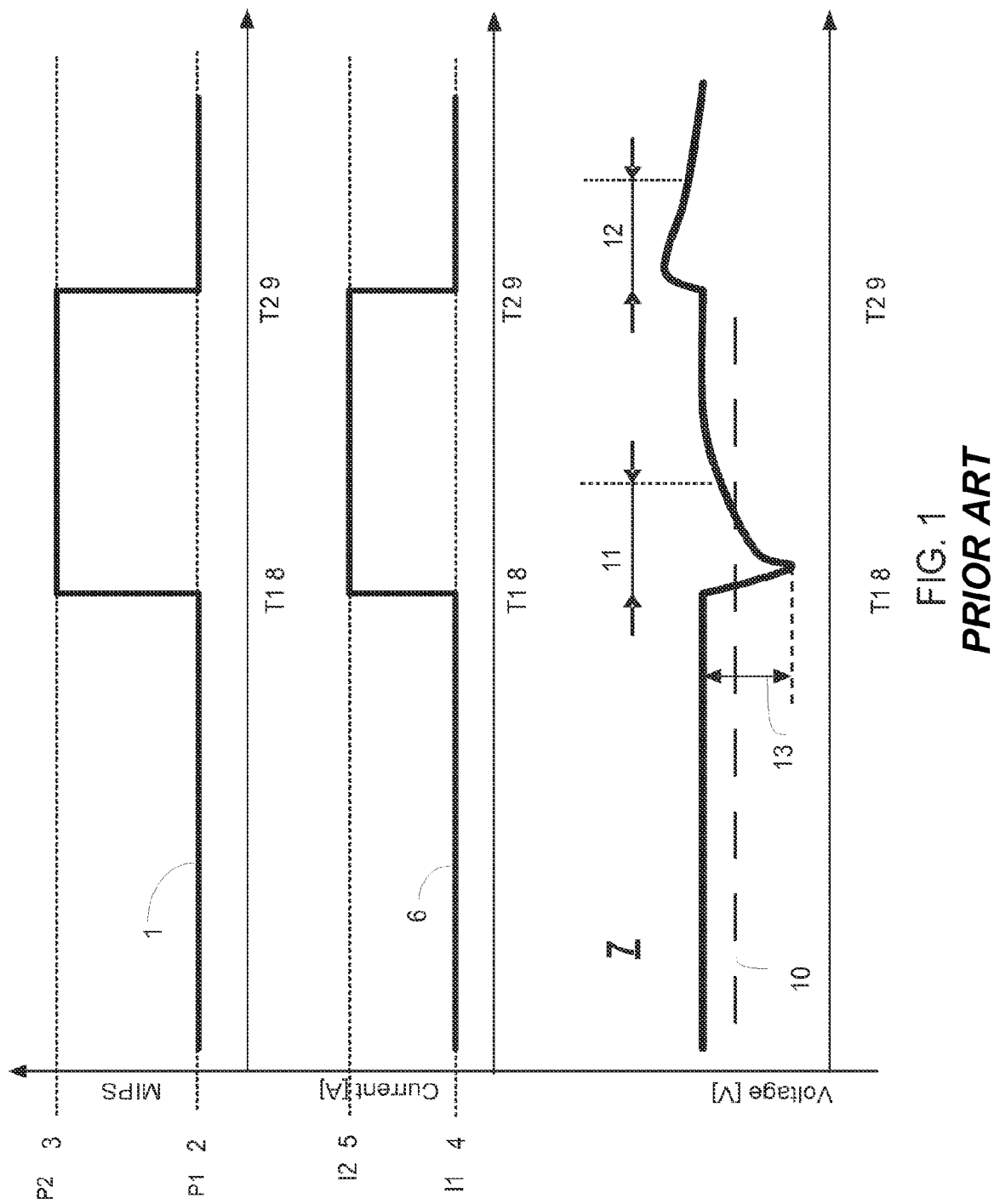
FIG. 1 schematically illustrates multiple signals.

In the following specification, the invention will be described with reference to specific examples of embodiments of the invention. It will, however, be evident that various modifications and changes may be made therein without departing from the broader spirit and scope of the invention as set forth in the appended claims.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

It has been shown that a selective reduction of the frequency of a clock signal provided to a processor that is followed by an increment of the frequency of that clock signal can reduce voltage drops and prevent intolerable voltage drops. The selective reduction can be performed in response to an indicator that indicates that the processor is expected to change its activity.

The processor can change its activity due to various activity changing events such as but not limited to a task switch.

The frequency of the clock signal can be decremented and then incremented if before the activity change event the processor was in a low performance mode such as an idle mode but this is not necessarily so. If the activity change event is not followed by an increment of the power consumption of the processor then the decrement does not damage the performance of the processor that continues to operate in a low performance mode in which it is not required to perform excessive computations. If, on the other hand, the activity change event is followed by an increment of the power consumption of the processor then the decrement of the frequency can prevent intolerable voltage drops.

The frequency changes can be determined by a control circuit that is configured to determine to change the frequency of the clock signal if the current power consumption of the processor is below a power consumption threshold or if the current power consumption of the processor indicates that the processor is in a low performance mode.

The increment and decrement of the frequency of the clock signal can be executed in a very short period, especially as it is executed without waiting to obtain an estimate of the power consumption of the processor after the activity change.

The frequency of the clock signal that is provided to the processor can occur without changing the frequency of another clock signal that is provided to other components of the device that includes the processor. These components can be connected to the processor.

The change of frequency of the clock signal provided to the processor can be performed by a clock source that is proximate to the processor or is included in the same integrated circuit as the processor—without changing the frequency of a clock signal provided to that integrated circuit. Accordingly, this change of frequency can be viewed as "local" and not "global" change.

The change of frequency can be executed within few clock cycles and thus is much faster than differential voltage and frequency scaling (DVFS). Accordingly, it can be applied when DVFS can not be applied. Alternatively, DVFS can be applied in conjunction with the decrement and increment of the frequency. It should be noted that while DVFS is aimed to provide power reduction the mentioned above change prevents intolerable voltage drops.

Figure 2:
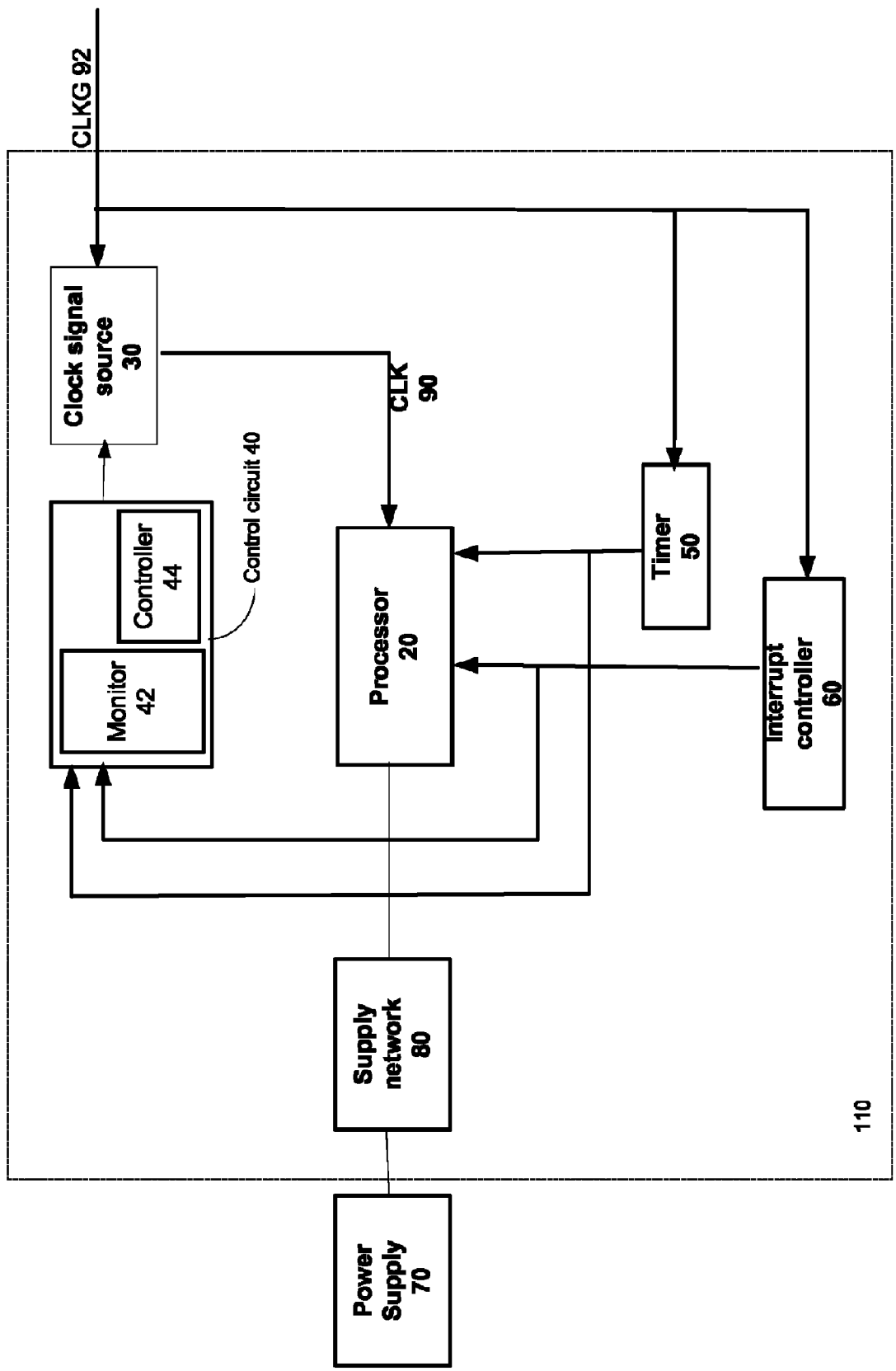
FIG. 2 schematically shows an example of an embodiment of a device.

FIG. 2 schematically shows an example of an embodiment of device 100. Device 100 can be an integrated circuit or can include one or more integrated circuits. It can be a mobile phone, a personal data accessory, a laptop computer, a desktop computer, a printed circuit board that is connected to one or more integrated circuits, a media player, a game console and the like.

Device 100 includes integrated circuit 110 that includes processor 20, clock signal source 30 and control circuit 40. Device 100 can include or be connected to one or more activity change triggering circuits such as timer 50 and interrupt controller 60, as well as to voltage source 70. Voltage source 70 is connected to integrated circuit 110 via supply network 80 to processor 20. Voltage source 70 can be included in device 100 (as illustrated in FIG. 2) but this is not necessarily so.

Control circuit 40 is connected to clock signal source 30 and to processor 20. It can control the frequency of the clock signal CLK 90 supplied by clock signal source 30. It can control the frequency in various manners including but not limited to sending increase frequency or decrease frequency signals, sending frequency value signals, and the like.

Clock signal source 30 receives another clock signal CLK2 92 and provides clock signal CLK 90 to processor 20. Other components such as timer 50 and interrupt controller 60 receive another CLK2 92. The other clock signal CLK2 92 can be provided from a source outside integrated circuit 110.

Processor 20 receives CLK 90 from clock signal source 30 and also receives activity change triggering signals from one or more activity change triggering circuits such as timer 50 and interrupt controller 60. Interrupt controller 60 can send an interrupt request to processor 20 that in turn responds by performing an activity change. Timer 50 can send to processor 20 a timing signal indicative that triggers an activity change of processor. An activity change triggering signal can be a task switch indicator but this is not necessarily so.

An activity change triggering signal can be the activity change indicator. Alternatively, one or more activity change triggering signals can be processed to provide the activity change indicator. The processing can include applying logic functions (such as an OR function between these two signals), delaying these signals (according to a delay between the reception of these signals by processor 20 and the actual activity change), and the like. Conveniently, at least one of the activity change triggering signal and the activity change indicator is generated at a predetermined time before the actual activity change occurs. It can be generated immediately (for example—one or few clock cycles) before an activity change events.

Control circuit 40 is configured to: (i) receive or generate an activity change indicator indicative that processor 20 is expected to perform an activity change; (ii) determine, in response to the activity change indicator and to a current power consumption of the processor, whether to change a frequency of the clock signal of the clock signal source; (iii) determine how to change the frequency of the clock signal if it determined to perform a change; and (iv) instruct clock signal source 30 to change the frequency of clock signal 90, if it determines to change the frequency, by a reduction of the frequency of clock signal 90 that is followed by an increment of the frequency of the clock signal 90.

Control circuit 40 can include monitor 42 that receives the one or more activity change triggering signals and generates the activity change indicator. Monitor 42 can send the activity change indicator to controller 44 that determines whether to change the frequency of the clock signal, how to change the frequency and instruct (or request) from clock signal source 30 perform the change.

The frequency change is responsive to an expected change of a supply voltage that is supplied to the processor, as a result of a possible change in a power consumption of the processor due to the expected activity change. This change can be evaluated in view of the characteristics of voltage source 70 and of supply network 80. Especially, the capability of voltage source 70 to respond to current changes will be taken into account. The supply voltage provided by voltage source 70 can be reduced by an amount (also referred to as voltage drop of voltage sag) so that it does decrease below a level that is required for a proper functionality of processor 20. It is noted that voltage drops over power network 80 can also be taken into account as IR drops developed over power network 80 reduce the supply voltage that reaches processor 20.

These characteristics can be fed to control circuit 40 that in turn can determine how to change the frequency of clock signal 90. Alternatively, these parameters are fed to another component (not shown) that determines how to change the frequency and sends to control circuit 40 information indicative of the required frequency changes. This information can be stored in control circuit 40 and used if determining to perform a frequency change.

In order to facilitate a fast frequency change control circuit 40 determines to change the frequency before the activity change is made. Accordingly, it determines to perform a frequency change based upon at least one of the following parameters or a combination thereof: (i) a current power consumption of the processor, and (ii) an expected increment in the power consumption of processor 20 after the activity change.

For example, control circuit 40 can determine to perform a frequency change if processor 20 is in a low performance mode or if the power consumption of processor 20 is below a power consumption threshold, and the like.

If, for example, processor 20 operates at the highest power consumption level then control circuit 40 usually does not alter the frequency of clock signal 90 despite an activity change.

Control circuit 40 can determine how to change the clock signal frequency or receive information indicative of such a determination from another component. The change of the frequency of the clock signal can be responsive to various parameters such as but not limited to: (i) allowable performance degradation due to clock frequency changes, (ii) capability of voltage source to withstand current changes, (iii) expected increment in power consumption of processor 20 due to activity change, and (iv) the current power consumption of processor 20.

The reduction of clock signal frequency reduces the amount of clock signals provided to the processor during a period during which the processor was expected to execute a task. Typically, the task can be executed during a slightly longer period and this slight timing deviation can be regarded as the allowable performance degradation. The decision of reduction of frequency should take into account the allowed reduction.

Voltages sources that can withstand larger changes in the power consumed by the processor can facilitate a lower frequency reduction and additionally or alternatively, a longer frequency reduction period.

The difference between the current and expected power consumptions of the processor can indicate the power consumption change expected due to the activity change and can affect the frequency change. Larger differences can require more aggressive frequency reduction and a slower recovery period (during which the frequency is increased till reaching a desired frequency).

The frequency change can be made in one or more manners such as but not limited to: (i) switching the frequency from a first frequency (provided before the activity change) to a second frequency (lower than the first frequency) and than jumping back to the first frequency; (ii) switching from the first frequency to a second frequency and then switching to a third frequency that can differ from the first frequency, (iii) switching from the first frequency to the second frequency and then performing one or more frequency changes (in a liner or non-liner manners) to the first frequency, (iv) switching from the first frequency to the second frequency and then performing one or more frequency changes (in a liner or non-liner manners) to the third frequency. The frequencies and period of providing a clock signal having these frequencies can be represented by timing and frequency characteristics.

After providing a clock signal of a second frequency the frequency can be changed in a step wise manner. These steps can be equal to each other or differ from each other.

Conveniently, the second frequency is the lowest frequency provided during the frequency change session but this is not necessarily so. The frequency can be changes between the second and first (or third) frequencies by frequency increments and optionally also one or more frequency decrement.

The frequency changes can be executed during a period of a length that can be fixed or changes according to various parameters such as voltage supply parameters, expected power consumption increment and allowed performance degradation.

For example—higher tolerable performance degradation can facilitate more extensive (in duration and/or value) frequency decrements. Thus, the second frequency can be lower or be provided during longer periods. Yet for another example—a voltage source that is less capable to manage current changes will require a provision of a clock signal of a lower frequency over a longer period. Lower estimated power consumption increments can be managed by a less aggressive frequency reduction.

For example, assuming that the frequency change involves switching between two fixed frequencies then the duration between one switch (frequency decrement) to another (frequency increment) can be responsive to the change in the supply voltage resulting from the activity change. Accordingly, control circuit 40 can estimate a change in the supply voltage resulting from the activity change; and determine a time difference between the reduction of the frequency of the clock signal and the increment of the frequency of the clock signal in response to the estimate.

Yet for another example, control circuit 40 can be configured to: estimate a change in the supply voltage resulting from the activity change; and determine timing and frequency characteristics of at least one out of the reduction of the frequency of the clock signal and an increment of the frequency of the clock signal.

Figure 4:
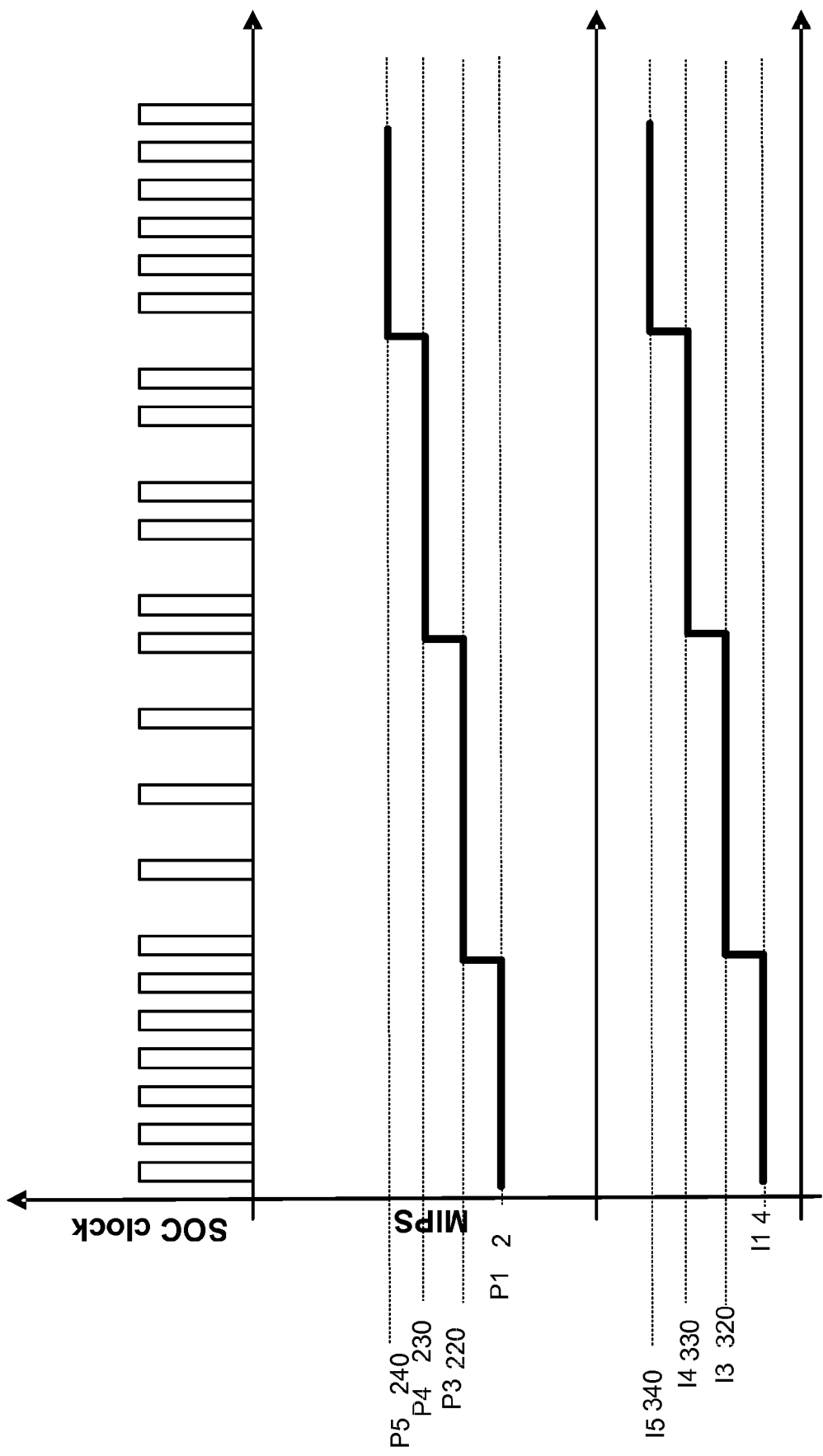

Yet for a further example, control circuit 40 can be is configured to determine a frequency change characteristic of the clock signal in response to a tolerable supply voltage drop resulting from the activity change. Various examples of changes of the frequency of the clock signal over time are illustrated in FIG. 4.

Yet for another example, control circuit 40 is configured to perform the reduction of the frequency of the clock signal immediately after determining to change the frequency of the clock signal.

Figure 3:
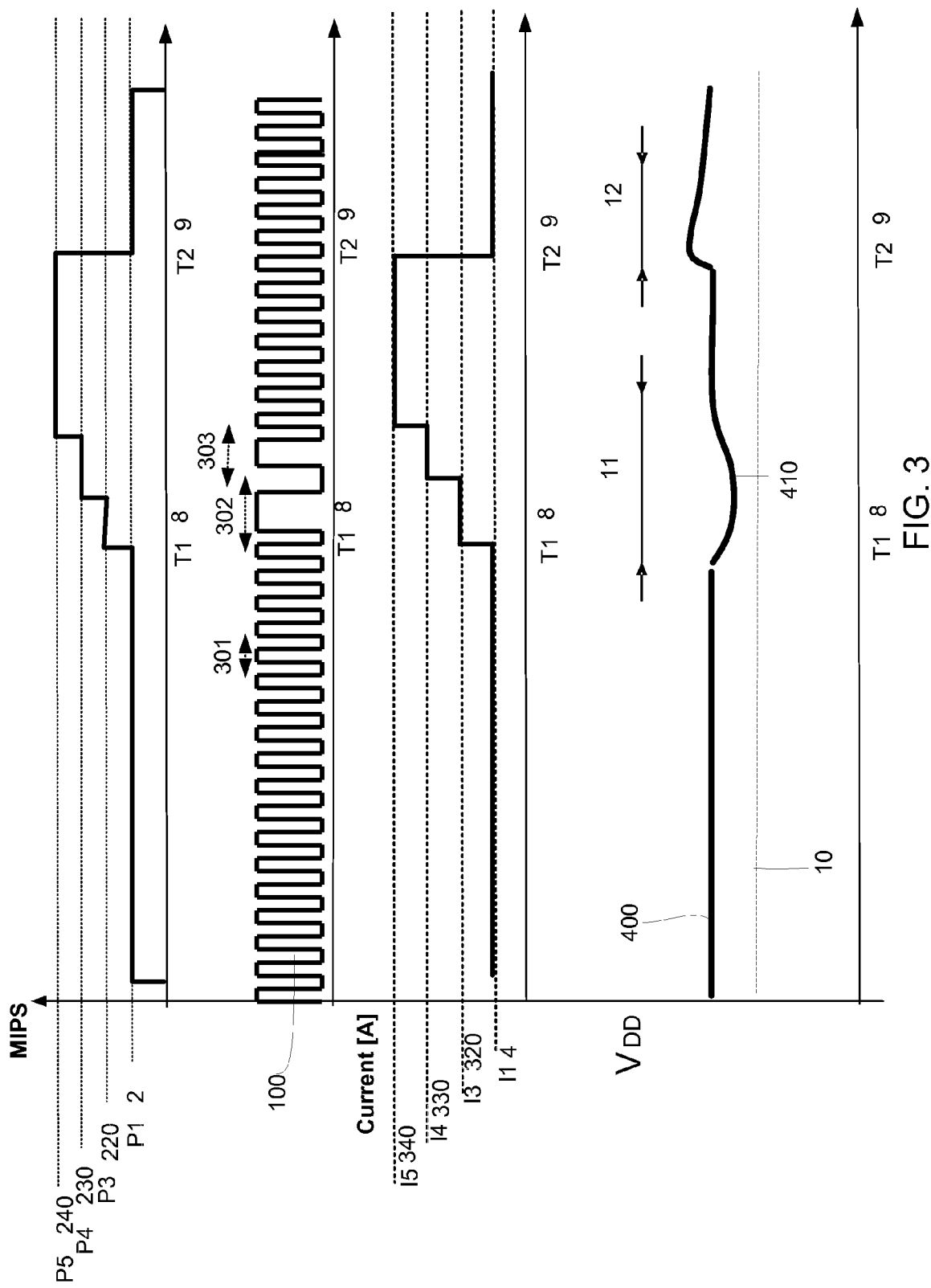
FIG. 3 and FIG. 4 schematically show examples of embodiments of multiple signals.

FIG. 3 schematically illustrates a voltage drop of a supply voltage due to a power consumption increment.

Curve 200 illustrates the performance (in MIPS) of processor 20. The performance is incremented in a gradual manner—thus it differs from the ramp increment of the performance illustrated in FIG. 1. During a first period (before T1 8) processor 20 operates in a low performance mode and its performance is low (P1 2). After the first time switch (at T1) the performance gradually increased (in three stages) to a second till fourth performance levels P3 220, P4 230 and P5 240 so that during most of the second period (between T1 8 and T2 9) processor 20 performance is high.

Curve 300 illustrates clock signal 100. During the first and third periods the frequency of clock signal 100 remains the same. Immediately after the first activity change (or during the activity change) the frequency of clock signal 100 is lowered and then increased. This is illustrated by the difference between the clock period PR1 301 during the first period and between the longer periods P2 302 and P3 303 of clock signal 100 that follow T1 8.

Curve 310 illustrates the current consumption of a processor. The current consumption is correlated with the performance. During the first period (before T1 8) the processor operates in the low performance mode and consumes a low amount of current (I1 4), during the second period (between T1 8 and T2 9) the current consumption is increased in a step wise manner, as illustrated by I3 320, I4 330 AND I5 340. At the third period the current falls back to its low value (I1 4).

Curve 400 illustrates the supply voltage that is supplied by a voltage source 70 to device 100. The supply voltage is higher than threshold 10 despite the activity change that occurs at T1 8. During regulation period 11 that follows T1 the supply voltage is decrease by a voltage drop 410 that is much smaller than voltage drop 13 of FIG. 1.

Figure 5:
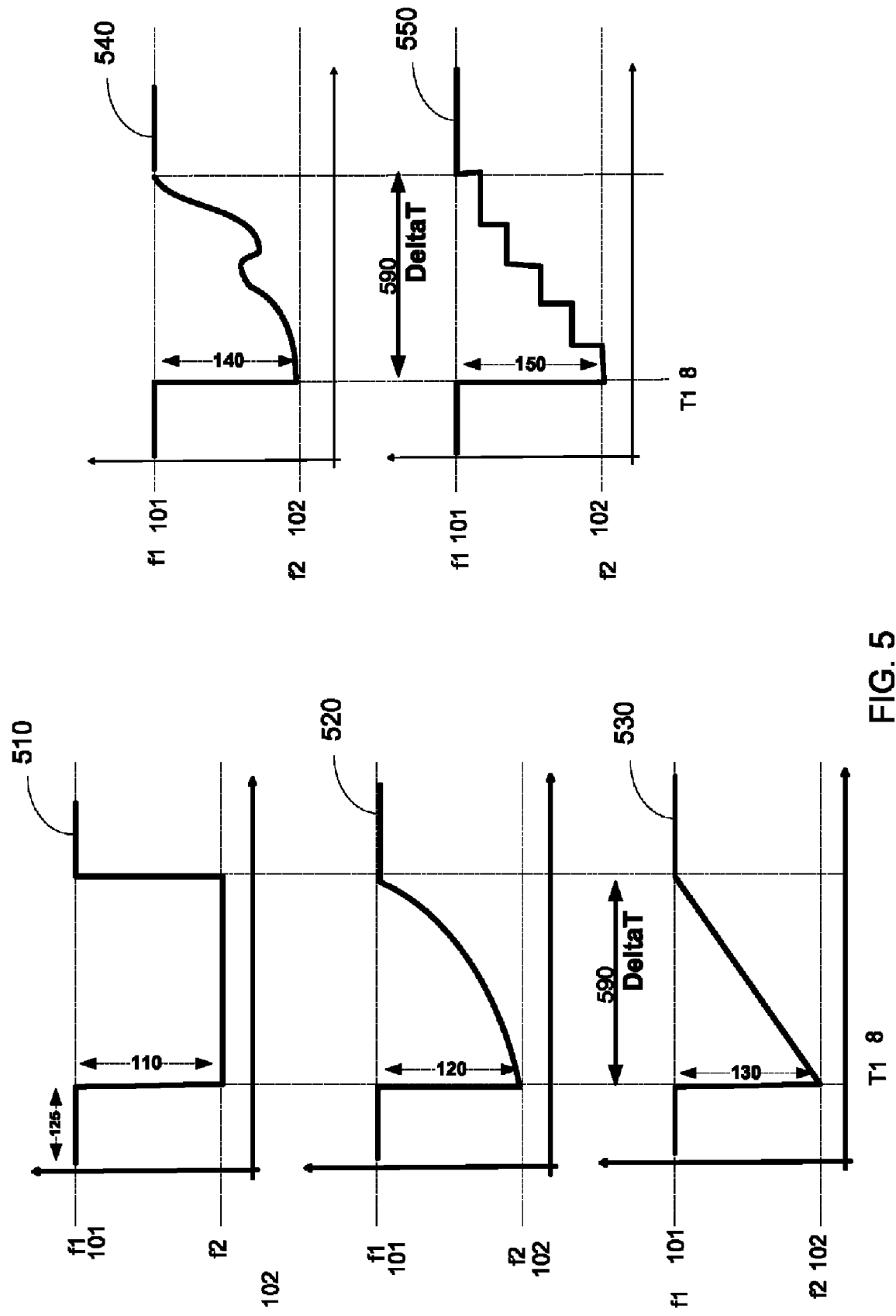
FIG. 5 schematically shows an example of an embodiment of a frequency changes.

FIG. 5 schematically shows an example of an embodiment of frequency changes.

Curves 510, 520, 530, 540 and 550 are samples of frequencies patterns. Each of these curves can be "stretched" over time and either shrunk or expanded in the frequency domain.

In each of these curves the clock signal frequency before T1 8 has a first value (first frequency f1 101), at T1 8 or immediately afterwards the frequency is decreased to a second frequency f2 102 and after the second activity change (at T2 9) is of first value (f1 101). These curves differ from each other by the manner in which the frequency is changes after it was reduced to second frequency f2 102.

Curve 510 illustrates that after T2 the frequency is maintained at f2 102 until a certain period (DeltaT 590) ends.

The duration of DeltaT 590 as well as the frequency difference between f1 101 and f2 102 can be responsive to the allowed performance penalty, to the expected increase in power consumption, to the characteristics of power supply 70 or a combination thereof. DeltaT 590 is usually shorter and even much shorter (for example—few percents) than the duration of the second period (T2-T2).

Curve 511 illustrates a frequency change in which the time difference (DeltaT' 590') between the frequency decrement and the frequency increment is shorter than DeltaT 590 of curve 510. Curve 522 illustrates a frequency change in which the lower frequency (f2' 102') is lower than second frequency f2 102 of curve 510.

Curve 520 illustrates that during period DeltaT 590 the frequency is increased in a non-linear (in this case—exponential) manner till reaching f1 101.

Curve 530 illustrates that during period DeltaT 590 the frequency is increased in a linear (in this case—causing a ramp) manner till reaching f1 101.

Curve 540 illustrates that during period DeltaT 590 the frequency is mostly increased but can also be decreased till reaching f1 101.

Curve 550 illustrates that during the period DeltaT 590 the frequency is increased in a step-wise manner till reaching f1 101.

Figure 6:
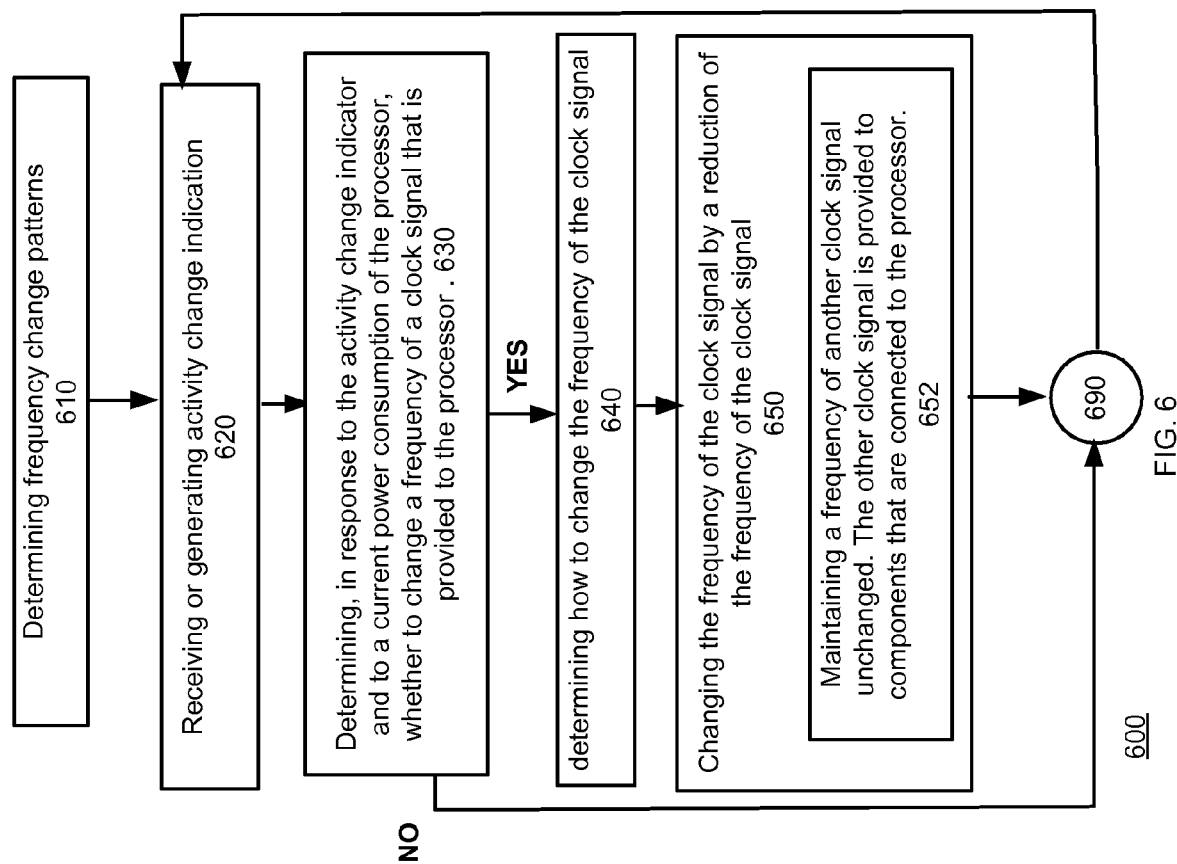
FIG. 6 schematically shows an example of an embodiment of a method.

FIG. 6 schematically shows an example of an embodiment of method 600.

Method 600 can start by preliminary stage 610 of determining frequency change patterns to be applied in response to an activity change. Alternatively, stage 610 can include receiving information that represents the frequency change patterns.

Stage 610 is followed by stage 620 of receiving or generating an activity change indicator indicative that a processor is expected to change its activity. Stage 620 can include receiving one or more activity change triggering signals. These signals can be the activity change indicators or can be processed to provide an activity change indicator. The activity change indicator can be a task switch indicator. An activity change triggering signal can trigger a task switch.

Stage 620 is followed by stage 630 of determining, in response to the activity change indicator and to a current power consumption of the processor, whether to change a frequency of a clock signal that is provided to the processor. For example, if the processor is in a low performance mode or its current power consumption is below a below a power consumption threshold then stage 630 can include determining to change the frequency.

Stage 630 is followed by stage 640, if determining to perform the frequency change. Else, is followed by stage 690 of not changing the frequency. Stage 690 can be followed by waiting to get an activity change indication and jumping to stage 620.

Stage 640 includes determining how to change the frequency of the clock signal. It can include selecting between predefined clock signal frequency patterns.

Stage 640 can include one of the following or a combination thereof: (i) estimating a change in the supply voltage resulting from the activity change and determining a time difference between the reduction of the frequency of the clock signal and the increment of the frequency of the clock signal in response to the estimate; (ii) estimating a change in the supply voltage resulting from the activity change and determining timing and frequency characteristic of at least one out of the reduction of the frequency of the clock signal and an increment of the frequency of the clock signal; (iii) determining a frequency change characteristic of the clock signal in response to a tolerable supply voltage drop resulting from the activity change.

Stage 640 is followed by stage 650 of changing the frequency of the clock signal by a reduction of the frequency of the clock signal that is followed by an increment of the frequency of the clock signal. The changing of the frequency of stage is determine is response to an expected change of a supply voltage that is supplied to the processor as a result of a possible change in a power consumption of the processor due to the activity change.

Stage 650 can be executed immediately after stage 640.

Stage 650 can also include stage 652 of maintaining a frequency of another clock signal unchanged. The other clock signal is provided to components that are connected to the processor.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

In addition, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device.

However, other modifications, variations, and alternatives are also possible. The specifications and drawings are, accordingly, to be regarded in an illustrative rather than in a restrictive sense.

The word 'comprising' does not exclude the presence of other elements or steps then those listed in a claim. Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

We claim:

1. A method for controlling power consumption of a processor, the method comprises:
   determining, in response to an activity change indicator and to a current power consumption of the processor, whether to change a frequency of a clock signal that is provided to the processor; wherein the activity change indicator indicates that the processor is expected to change its activity;
   changing, if determining to change the frequency of the clock signal, the frequency of the clock signal by a reduction of the frequency of the clock signal that is followed by an increment of the frequency of the clock signal; and
   modifying the frequency of the clock signal provided to the processor while maintaining a frequency of another clock signal that is provided to components that are coupled to the processor unchanged;
   wherein the changing of the frequency of the clock signal is responsive to an expected change of a supply voltage that is supplied to the processor as a result of a possible change in a power consumption of the processor due to an expected change of activity of the processor.

2. The method according to claim 1 comprising determining to change the frequency of the clock signal if the current power consumption of the processor is below a power consumption threshold.

3. The method according to claim 1 comprising determining to change the frequency of the clock signal if the current power consumption of the processor indicates that the processor is in a low performance mode.

4. The method according to claim 1 comprising:
   estimating a change in the supply voltage resulting from the expected change of activity of the processor; and
   determining a time difference between the reduction of the frequency of the clock signal and the increment of the frequency of the clock signal in response to the estimate.

5. The method according to claim 1 comprising:
   estimating a change in the supply voltage resulting from the expected change of activity of the processor; and
   determining timing and frequency characteristic of at least one out of the reduction of the frequency of the clock signal and an increment of the frequency of the clock signal.

6. The method according to claim 1 comprising performing the reduction of the frequency of the clock signals immediately after determining to change the frequency of the clock signal.

7. The method according to claim 1 comprising receiving an activity change indicator which is a task switch indicator.

8. The method according to claim 1 comprising receiving at least one activity change triggering signal and generating the activity change indicator.

9. A method for controlling power consumption of a processor, the method comprises:
   determining, in response to an activity change indicator and to a current power consumption of the processor, whether to change a frequency of a clock signal that is provided to the processor; wherein the activity change indicator indicates that the processor is expected to change its activity;
   changing, if determining to change the frequency of the clock signal, the frequency of the clock signal by a reduction of the frequency of the clock signal that is followed by an increment of the frequency of the clock signal; and
   determining a frequency change characteristic of the clock signal in response to an estimated tolerable supply voltage drop resulting from the expected change in the activity of the processor;
   wherein the changing of the frequency of the clock signal is responsive to an expected change of a supply voltage that is supplied to the processor as a result of a possible change in a power consumption of the processor due to an expected change of activity of the processor.

10. A device having power consumption control capabilities, the device comprises:
    a clock signal source configured to supply a clock signal to a processor;
    a control circuit, coupled to the clock signal source, the control circuit is configured to:
       determine, in response to an activity change indicator and to a current power consumption of the processor, whether to change a frequency of the clock signal of the clock signal source, wherein the activity change indicator indicates that the processor is expected to change its activity; and
       request a clock signal source to change the frequency of the clock signal, if determining to change the frequency, by a reduction of the frequency of the clock signal that is followed by an increment of the frequency of the clock signal;
       wherein the changing of the frequency of the clock signal is responsive to an expected change of a supply voltage that is supplied to the processor, as a result of a possible change in a power consumption of the processor due to an expected change of activity of the processor; and
    components that are coupled to the processor; wherein the components receive another clock signal that has a frequency that remains unchanged despite the change of the frequency of the clock signal that is provided to the processor.

11. The device according to claim 10 wherein the control circuit is configured to determine to change the frequency of the clock signal that is provided to the processor if the current power consumption of the processor is below a power consumption threshold.

12. The device according to claim 10 wherein the control circuit is configured to determine to change the frequency of the clock signal that is provided to the processor if the current power consumption of the processor indicates that the processor is in a low performance mode.

13. The device according to claim 10 wherein the control circuit is configured to:
  estimate a change in the supply voltage resulting from the expected change of activity of the processor; and
  determine a time difference between the reduction of the frequency of the clock signal that is provided to the processor and the increment of the frequency of the clock signal that is provided to the processor in response to the estimate.

14. The device according to claim 10 wherein the control circuit is configured to:
  estimate a change in the supply voltage resulting from the expected change of activity of the processor; and
  determine timing and frequency characteristics of at least one out of the reduction of the frequency of the clock signal that is provided to the processor and an increment of the frequency of the clock signal that is provided to the processor.

15. The device according to claim 10 wherein the control circuit is configured to perform the reduction of the frequency of the clock signals immediately after determine to change the frequency of the clock signal that is provided to the processor.

16. The device according to claim 10 wherein the control circuit is configured to receive the activity change indicator which is a task switch indicator.

17. The device according to claim 10 wherein the control circuit comprises a monitor that receives at least one activity change triggering signals and provides the activity change indicator.

18. A device having power consumption control capabilities, the device comprises:
  a clock signal source configured to supply a clock signal to a processor;
  a control circuit, coupled to the clock signal source, the control circuit is configured to:
    determine, in response to an activity change indicator and to a current power consumption of the processor, whether to change a frequency of the clock signal of the clock signal source, wherein the activity change indicator indicates that the processor is expected to change its activity; and
    request a clock signal source to change the frequency of the clock signal, if determining to change the frequency, by a reduction of the frequency of the clock signal that is followed by an increment of the frequency of the clock signal;
  wherein the changing of the frequency of the clock signal is responsive to an expected change of a supply voltage, that is supplied to the processor, as a result of a possible change in a power consumption of the processor due to an expected change of activity of the processor;
  wherein the control circuit is configured to determine a frequency change characteristic of the clock signal in response to an estimated tolerable supply voltage drop resulting from the expected change of activity of the processor.

* * * * *